C. LEA.
WHEELS FOR VEHICLES.
No. 174,138. Patented Feb. 29, 1876.
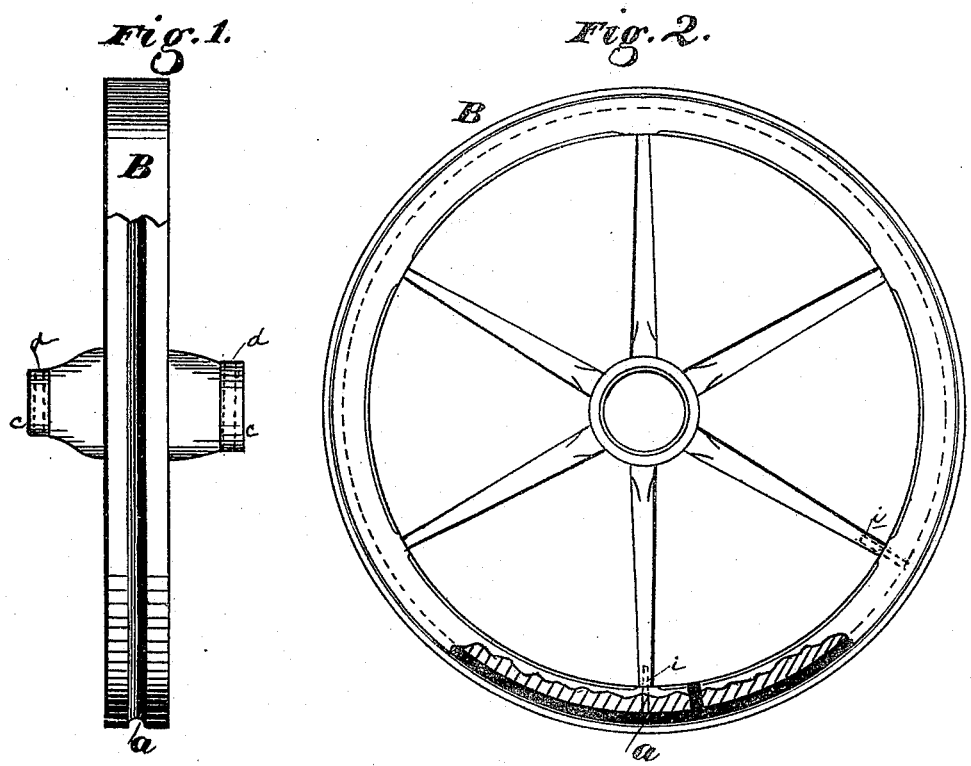
Witnesses
Geo. H. Strong
Jm. L. Borne
Inventor
Charles Lea
by Dewey & Co.
his Attorneys

UNITED STATES PATENT OFFICE.

CHARLES LEA, OF FLORIN, CALIFORNIA.

IMPROVEMENT IN WHEELS FOR VEHICLES.

Specification forming part of Letters Patent No. 174,138, dated February 29, 1876; application filed October 29, 1875.

*To all whom it may concern:*

Be it known that I, CHARLES LEA, of Florin, Sacramento county, State of California, have invented an Improvement in Wheels for Vehicles; and I do hereby declare the following description and accompanying drawings are sufficient to enable any person skilled in the art or science to which it most nearly appertains to make and use my said invention or improvement without further invention or experiment.

My invention relates to the preservation of the wood-work of wagon and carriage wheels, and it consists in the process hereinafter described and claimed.

In the construction of wagon and carriage wheels, in order to preserve the wooden felly and prevent it from shrinking and swelling, I make a groove in the face of the felly, so as to extend entirely around the wheel. The tire or band B is then shrunk on over the felly, so as to make a perfectly tight fit all around. A hole can then be drilled through the tire, so as to communicate with the groove, through which the groove is filled with oil or other liquid wood-preserving agent, after which the hole is stopped up by a plug, so as to prevent the escape of the oil. The hub of the wheel I preserve by making a groove, $d$, (shown in dotted lines,) around each end, underneath the bands $c$ $c$, and filling them with oil, as above described. By boring a hole, $i$, (shown in dotted lines,) from the bottom of the groove in the felly centrally through each spoke, I also supply the spokes with the preserving liquid.

I am aware that stationary timbers have been provided with a permanent oil fountain or chamber for the single purpose of preventing decay; but by applying the oil-fountain to the wood-work of vehicle-wheels I secure an additional advantage of preventing the shrinking and swelling of the wood, thereby preserving their original shape and strength.

Having thus described my invention, what I claim, and desire to secure by Letters Patent, is—

As a new article of manufacture, a wagon or carriage wheel constructed as described, and having grooves made in the face of the fellies around the entire wheel, covered closely by shrinking on the tire, said groove being filled with oil or other wood-preserving agent, substantially as set forth.

CHARLES LEA.

Witnesses:
 R. DAVIS,
 C. W. SIDDALL.